2,846,434
Patented Aug. 5, 1958

2,846,434

PROCESS FOR THE PRODUCTION OF GREY VAT DYESTUFFS OF THE BENZANTHRONE SERIES, AND THE PRODUCTION OF OLIVE-GREEN VAT DYESTUFFS THEREFROM

Hans-Samuel Bien, Leverkusen, and Fritz Baumann, Leverkusen-Bayerwerk, Germany, assignors to Farbenfabriken Bayer Aktiengesellschaft, Leverkusen, Germany, a corporation of Germany No Drawing. Application June 22, 1955
Serial No. 517,393

Claims priority, application Germany June 24, 1954

15 Claims. (Cl. 260—274)

This invention relates to a process for the production of grey vat dyestuffs of the benzanthrone series, and the production of olive-green vat dyestuffs therefrom.

It is known that dyestuffs of the "benzanthronimide green series" (Formula I) and "benzanthronisoimide green series" (Formula II) dye cotton in fast shades, which are usually green to olive-green.

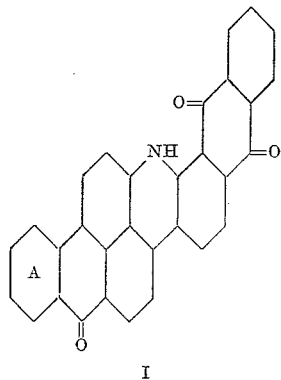

I

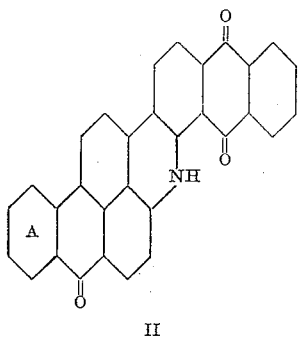

II

Moreover, anthraquinonyl amino derivatives of I, which contain an α-anthraquinonyl amino radical in the nucleus which is indicated by A in the Formula I above, still produce an olive-green color (German Specification 517,442).

It is an object of the present invention to provide novel grey vat dyestuffs which have excellent fastness properties. A further object is to provide from these grey dyestuffs novel olive-grey vat dyestuffs which exhibit excellent fastness properties as well. Other objects will appear hereinafter.

These objects are attained in accordance with the present invention by the treatment of anthraquinonyl imino-bz-1-benzanthrone carboxylic acid-(α-anthraquinonyl) amides (Formula III) with alkaline condensation agents. The novel dyestuffs thus obtained

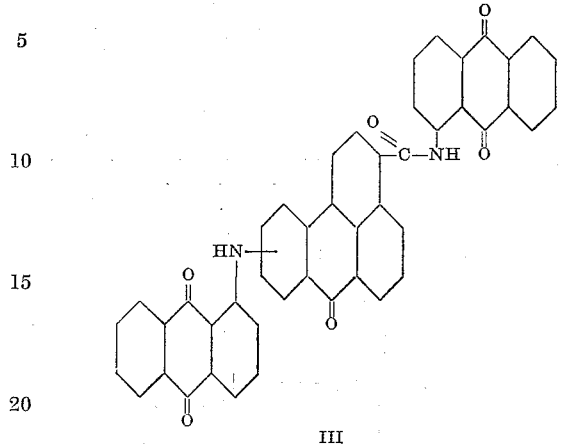

III dye cotton in very fast and usually grey shades.

Furthermore, the novel dyestuffs obtained by the alkaline condensation of anthraquinonyl imino-bz-1-benzanthrone carboxylic acid-(α-anthraquinonyl) amides are transformed by aftertreatment with acid condensation agents into fast olive-green vat dyestuffs.

The anthraquinonyl imino-bz-1-benzanthrone carboxylic acid-(α-anthraquinonyl) amides serving as starting material for the process of the present invention can, for example, be obtained by reacting 1 mol of a 6- or 8-bromo-bz-1-benzanthrone carboxylic acid chloride or a mixture thereof with 2 mols of α-amino-anthraquinone.

The 6- or 8-bromo-bz-1-benzanthrone carboxylic acid can be obtained either by bromination of the benzanthrone carboxylic acid or by saponification of bromobenzanthrone nitrile obtained from technical dibromobenzanthrone by exchange of a bromine group for the nitrile group by amines of cuprous cyanide.

The bromo-benzanthrone carboxylic acid thus obtained can be transformed into the bromo-benzanthrone carboxylic acid chloride by known manner, for example, by reaction with thionyl chloride. The reaction of 1 mol of this 6- or 8-bromo-bz-1-benzanthrone-carboxylic acid chloride with 2 mols of α-amino-anthraquinone can be carried out in 2 steps by reacting first the acid chloride with 1 mol of α-amino-anthraquinone and second by subsequent conversion of the bromo-benzanthrone carboxylic acid-α-anthraquinonylamide formed into the α-(anthraquinonyl-imino)-benzanthrone carboxylic acid-(α-anthraquinonyl)-amide by reaction with a second mol of α-amino-anthraquinone, the steps being carried out under the known conditions most suitable for the underlying reaction.

Instead of using α-amino-anthraquinone itself, it is also possible to use derivatives thereof, such as, for example, its acylamino, sulphone, sulphonamide or halogen substitution products for this reaction.

Examples of alkaline condensation agents which can be used in the production of the novel grey dyestuffs are alcoholic caustic potash solution and alcoholic caustic soda solution. If desired, sulfur may be added to this mixture. The reaction is carried out with advantage at elevated temperature, preferably in a temperature range of about 100 to 200° C.

Examples of acid condensation agents under the influence of which the novel grey dyestuffs can be converted in accordance with the invention into the fast, olive-green vat dyestuffs are chlorosulphonic acid, sulphuric acid, phosphoric acid and a sodium chloride/aluminum chloride mixture.

The following examples further illustrate the invention without, in any way, limiting it.

Example 1

35.3 parts of bromo-benzanthrone carboxylic acid, 380.0 parts of nitrobenzene and 17.1 parts of thionyl chloride are heated for one hour at 100° C., the acid gradually entering into solution with formation of its chloride, which crystallizes in long yellow needles upon cooling. After the reaction is complete, the excess thionyl chloride with about 20 parts of the nitrobenzene are distilled off and 24.5 parts of α-amino-anthraquinone are added to the reaction solution. The temperature is raised to 130° C. and maintained at this level for about 2 hours. After being boiled for a short period, the mixture is allowed to cool and the bromo-benzanthrone carboxylic acid-α-anthraquinonyl amide forming in yellow needles is filtered off with suction at 100° C.

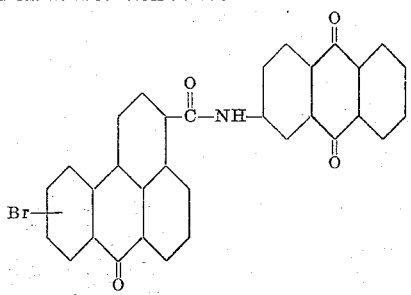

This substance dissolves in sulphuric acid with a reddish brown color and there is no change in color upon adding formaldehyde. The correponding acyl amines of derivatives of α-amino-anthraquinone can also be prepared in an analogous manner.

The bromo-benzanthrone carboxylic acid can be prepared by the following procedure:

50 grams of benzanthrone carboxylic acid are dissolved in 150 cc. of chlorosulfonic acid. Upon addition of 1 gram of iodine 15 cc. of bromine are added. The reaction mixture is stirred at a temperature of 40° C. until a worked up sample shows a bromine content of 23 to 25% bromine. The mixture is then worked up by adding sulfuric acid of 60° Bé. and pouring onto a mixture of ice and aqueous sodium bisulfite solution. The precipitate thus obtained is filtered off and washed until the filtrate shows neutral reaction. The bromo-benzanthrone carboxylic is thus obtained in quantitative yield. M. P. 310 to 320° C.

Example 2

55.8 parts of bromo-benzanthrone carboxylic acid-α-anthraquinonyl amide produced for example as described in Example 1, 24.5 parts of α-amino-anthraquinone, 10.6 parts of soda, 500.0 parts of nitrobenzene and 1.0 part of copper acetate are heated for 15 hours at the boiling point. The α-(anthraquinonylimino)-benzanthrone carboxylic acid (α-anthraquinonyl)-amide which forms as brown crystals and which has the following formula:

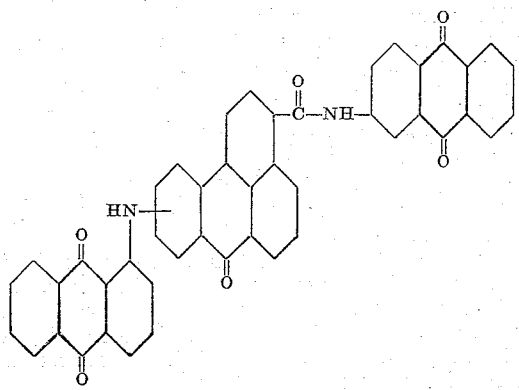

is filtered off with suction at 150° C. and washed with warm nitrobenzene until the liquid discharging is practically colorless. After being boiled with hydrochloric acid and dried, the product is obtained in a practically quantitative yield. It dissolves in sulfuric acid with a yellowish brown color and changes to bluish olive-green when formaldehyde is added.

The α-aminoanthraquinone used in this example can also be replaced by a derivative thereof.

Example 3

35.3 parts of bromo-benzanthrone carboxylic acid, 380.0 parts of nitrobenzene and 17.1 parts of thionyl chloride are heated for one hour at 100° C. and after the acid chloride has formed quantitatively, the excess thionyl chloride is distilled off under vacuum together with 20 parts of nitrobenzene. After the addition of 24.5 parts of α-amino-anthraquinone, the temperature is raised to 130° C. and maintained at this level until this material has changed completely into benzanthrone carboxylic acid-α-anthraquinonyl amide, which crystallizes in the form of yellow needles. 18 parts of soda, 22.3 parts of α-amino-anthraquinone and also 0.6 part of copper acetate and 0.6 part of cuprous cholride are now added, and the mixture heated for 15 hours at the boiling point, whereby the bromine is replaced by the α-anthraquinonyl amine radical. The resulting product, which forms brown crystals and is identical with the product obtained in Example 2, is filtered off with suction at 150° C. The product can be further worked up in the manner described in the previous example.

Example 4

14 parts of the condensation product obtained as described in Example 2 or 3 are heated for about an hour at a temperature of 110° C. in a solution of 70 parts of potassium hydroxide and 60 parts of methanol. The product, which is initially insoluble in the melt, enters into solution with a brown color, which changes to reddish violet on the surface. When the reaction is complete, the melt is added to 1000 parts of water, the dyestuff forming as greyish black flakes, which can be after-oxidized with chlorine liquor. The dyestuff is filtered off with suction and washed until neutral; this dyestuff dyes vegetable fibers in fast grey shades from a brown vat. The color of its solution in sulphuric acid is a dull blue green.

For the purpose of further purification, the dyestuff can be extracted with pyridine or precipitated from sulfuric acid. The pure compound crystallizes from nitronaphthalene in small grey needles, which dissolve with a greenish blue color in sulfuric acid and vat-dye with a dull blue color.

Example 5

14 parts of the condensation product obtained as described in Example 2 or 3 are introduced at a temperature of 100° C. into a solution of 250 parts of potassium hydroxide in 350 parts of ethanol and the temperature of the reaction mixture is raised to 170° C., the excess alcohol distilling off. After two hours, the product is worked up as indicated in the preceding example. The two dyestuffs prove to be identical.

Example 6

14 parts of the condensation product obtained as described in Example 2, 70 parts of potassium hydroxide, 70 parts of methanol and 3 parts of sulfur are heated for 1½ hours at 150° C. and worked up in the usual manner. A grey, very fast vat dyestuff is obtained. It dissolves in sulfuric acid with a dull greenish blue color, while the vat is currant-colored.

Example 7

14 parts of the condensation product (obtained by acylation of α-amino-anthraquinone with bromo-benzanthrone carboxylic acid chloride and exchange of the bromine for 1-amino-5-benzoylamino-anthraquinone by means of an anthrimide melt) are heated for one hour at 120° C. in a solution of 70 parts of potassium hydroxide in 60 parts of ethanol. The reaction mixture is worked up in the manner indicated in Example 4. The dyestuff obtained dyes cotton with reddish grey shades, dissolves with a greenish blue color in sulfuric acid and is brown when vatted.

*Example 8*

120 parts of phosphoric acid and 7 parts of a product obtained as described in Example 4 are heated for 2 hours at 200° C. The initially sparingly soluble dyestuff gradually dissolves with a violet color. When the reaction is complete, the melt is diluted with water and the dyestuff forming in dark green flakes is washed until neutral and then dried. It dyes vegetable fibers in fast olive-green shades from a bluish green vat. The color of its solution in sulfuric acid is violet.

*Example 9*

20 parts of the grey dyestuff of Example 4 are introduced at 120° C. into a melt of 133 parts of aluminum chloride and 58 parts of sodium chloride. The dyestuff initially dissolves with a green color, but this changes in a short time through blue green to dull violet. After about an hour, the melt is poured into dilute hydrochloric acid and the olive-green formed dyestuff is freed from adhering salts by being boiled several times with hydrochloric acid. This dyestuff is practically identical with the product described in Example 8.

*Example 10*

4 parts of a dyestuff prepared as described in Example 4, are dissolved in 60 parts of concentrated sulfuric acid and heated for 3 hours at 55° C. When the initially greenish blue color of the reaction solution has become violet, the solution is added to ice and the olive-green dyestuff thus obtained is washed until neutral. This dyestuff dyes vegetable fibers in very strong bluish olive-green shades.

We claim:

1. The dyestuffs obtained by reacting a member selected from the group consisting of anthraquinonyl imino-bz-1-benzanthrone carboxylic acid-(α-anthraquinonyl)-amide and α-(benzoylamino-anthraquinonyl-imino)-bz-1-benzanthrone carboxylic acid-(α-anthraquinonyl)-amide with an alkaline condensing agent selected from the group consisting of alcoholic potassium hydroxide and alcoholic sodium hydroxide at a temperature between about 100° C. and about 200° C. and recovering the dyestuff formed.

2. A process for the production of vat dyestuffs which comprises reacting a member selected from the group consisting of anthraquinonyl imino-bz-1-benzanthrone carboxylic acid-(α-anthraquinonyl)-amide and α-(benzoylamino-anthraquinonyl-imino)-bz-1-benzanthrone carboxylic acid-(α-anthraquinonyl)-amide with an alkaline condensing agent selected from the group consisting of alcoholic potassium hydroxide and alcoholic sodium hydroxide at a temperature between about 100° C. and about 200° C. and recovering the dyestuff formed.

3. As novel vat dyestuffs the dyestuffs of claim 1, which are subjected to an aftertreatment with an acid condensation agent selected from the group consisting of chlorosulphonic acid, sulphuric acid, phosphoric acid and a mixture of sodium chloride and aluminum chloride.

4. As novel vat dyestuff the dyestuff which is obtained by reacting anthraquinonyl imino-bz-1-benzanthrone carboxylic acid-(α-anthraquinonyl)-amide with alcoholic potassium hydroxide.

5. As novel vat dyestuff the dyestuff which is obtained by reacting anthraquinonyl imino-bz-1-benzanthrone carboxylic acid-(α-anthraquinonyl)-amide with alcoholic potassium hydroxide in the presence of sulfur.

6. As novel vat dyestuff the dyestuff which is obtained by reacting α-(5-benzoylamino-anthraquinonyl-imino)-bz-1-benzanthrone carboxylic acid-(α-anthraquinonyl)-amide with alcoholic potassium hydroxide.

7. As novel vat dyestuff the dyestuff which is claimed in claim 4 and which is subjected to an aftertreatment with phosphoric acid.

8. As novel vat dyestuff the dyestuff which is claimed in claim 4 and which is subjected to an aftertreatment in a melt consisting of aluminum chloride and sodium chloride.

9. As novel dyestuff the dyestuff which is claimed in claim 4 and which is subjected to an aftertreatment with concentrated sulfuric acid.

10. A process for the production of vat dyestuffs, which comprises subjecting the dyestuff obtained according to the procedure of claim 2 to an aftertreatment with an acid condensation agent selected from the group consisting of chlorosulphonic acid, sulphuric acid, phosphoric acid and a mixture of sodium chloride and aluminum chloride and recovering the dyestuff formed.

11. A process for the production of a grey vat dyestuff, which comprises reacting anthraquinonyl imino-bz-1-benzanthrone carboxylic acid-(α-anthraquinonyl)-amide with alcoholic potassium hydroxide at a temperature between about 100° C. and 200° C. and recovering the dyestuff formed.

12. A process for the production of a grey vat dyestuff, which comprises reacting anthraquinonyl imino-bz-1 - benzanthrone carboxylic acid - (α-anthraquinonyl)-amide with alcoholic potassium hydroxide at a temperature between about 100° C. and 200° C. and in the presence of sulfur and recovering the dyestuff formed.

13. A process for the production of a grey vat dyestuff, which comprises reacting α-(5-benzoyl-amino-anthraquinonylimino) - bz - 1 - benzanthrone carboxylic acid-(α-anthraquinonyl)-amide with alcoholic potassium hydroxide at a temperature between about 100° C. and 200° C. and recovering the dyestuff formed.

14. A process for the production of a grey vat dyestuff, which comprises reacting anthraquinonyl imino-bz-1-benzanthrone carboxylic acid-(α-anthraquinonyl)-amide with alcoholic potassium hydroxide at a temperature between about 100° C. and 200° C., recovering the dyestuff formed, subjecting this dyestuff to an aftertreatment with sulfuric acid and recovering the dyestuff again.

15. A process for the production of a grey vat dyestuff, which comprises reacting anthraquinonyl imino-bz-1 - benzanthrone carboxylic acid - (α - anthraquinonyl)-amide with alcoholic potassium hydroxide at a temperature between about 100° C. and 200° C., recovering the dyestuff formed, subjecting the dyestuff to an aftertreatment with a melt consisting of aluminum chloride and sodium chloride and recovering the dyestuff again.

References Cited in the file of this patent

UNITED STATES PATENTS

| | | |
|---|---|---|
| 1,845,469 | Wolff et al. | Feb. 16, 1932 |
| 2,494,811 | Holbro et al. | Jan. 17, 1950 |

UNITED STATES PATENT OFFICE
Certificate of Correction

Patent No. 2,846,434                          August 5, 1958

Hans-Samuel Bien et al.

It is hereby certified that error appears in the printed specification of the above numbered patent requiring correction and that the said Letters Patent should read as corrected below.

Column 3, lines 19 to 30, Example 1, the formula should appear as shown below instead of as in the patent—

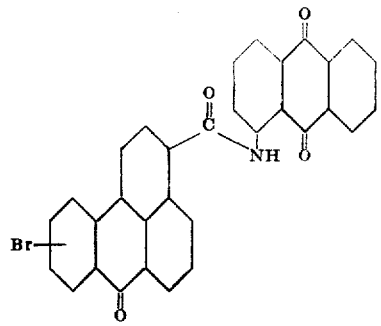

same column 3, lines 61 to 75, Example 2, the formula should appear as shown below instead of as in the patent—

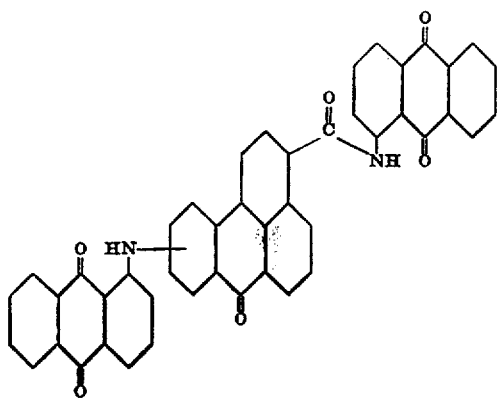

Signed and sealed this 30th day of December 1958.

[SEAL]

Attest:
KARL H. AXLINE,
*Attesting Officer.*

ROBERT C. WATSON,
*Commissioner of Patents.*